Inventors
Milton O. Schur
Benjamin G. Hoos

UNITED STATES PATENT OFFICE 2,171,419

FABRIC-REINFORCED ARTIFICIAL LEATHER

Milton O. Schur and Benjamin G. Hoos, Berlin, N. H., assignors to Brown Company, Berlin, N. H., a corporation of Maine Original application May 10, 1935, Serial No. 20,829. Divided and this application February 18, 1936, Serial No. 64,498

11 Claims. (Cl. 154—50)

This invention relates to fabric-reinforced, binder-impregnated felts. While not limited thereto, it deals more especially with a composite sheet comprising a felt layer and a cloth reinforcement both impregnated with rubber and useful as a leather substitute for various purposes.

In accordance with a preferred practice of producing products embodying the present invention, a web of felted fibers of either dry-laid or wet-laid variety is progressively passed through a bath of rubber latex simultaneously with a sheet of fabric or cloth. The fabric or cloth is preferably kept from contact with the web until the latter has been thoroughly impregnated and has hence been swollen substantially as far as possible by the water content of the latex. The fabric and web are then brought together in superposed relationship at the periphery of the lower roll of a pair of squeeze rolls, the lower one of which may rotate partially submerged in the bath; and the superposed, latex-impregnated layers are then passed about a portion of the submerged periphery of the lower roll, then into the nip of the rolls, and finally onwardly to a dryer. During the period of wrap about the periphery of the lower roll and immediately before entering the nip, the fabric layer, which is on the outside, is caused to exert a comparatively gentle squeezing action on the latex-impregnated felt and thus to become intimately associated with the felt layer and partly to remove the excess impregnant. The latex being distributed in a state of substantial continuity throughout both layers can then be set or dried to weld together the layers into an integral sheet to which desirable qualities are imparted by each component layer or ply, as will hereinafter appear in greater detail. The welding or bonding thus realized between the two layers or plies is so great that their separation or pulling apart requires substantially as much effort as separation of the impregnated felt layer itself into plies. So far as we have been able to determine, such tenacious bond between the two layers cannot be realized when each of the layers are separately impregnated with rubber latex, dried, and then bonded together with rubber latex or so-called rubber solutions. In such latter case, we have found that the so-called internal ply cohesion of the impregnated felt layer itself is decidedly greater than the bond between the felted and fabric layers and that the fabric layer can be pulled away too easily from the felted layer.

With the foregoing and other features and objects in view, we shall now describe our invention with particular reference to the accompanying drawing, wherein—

Figure 1:
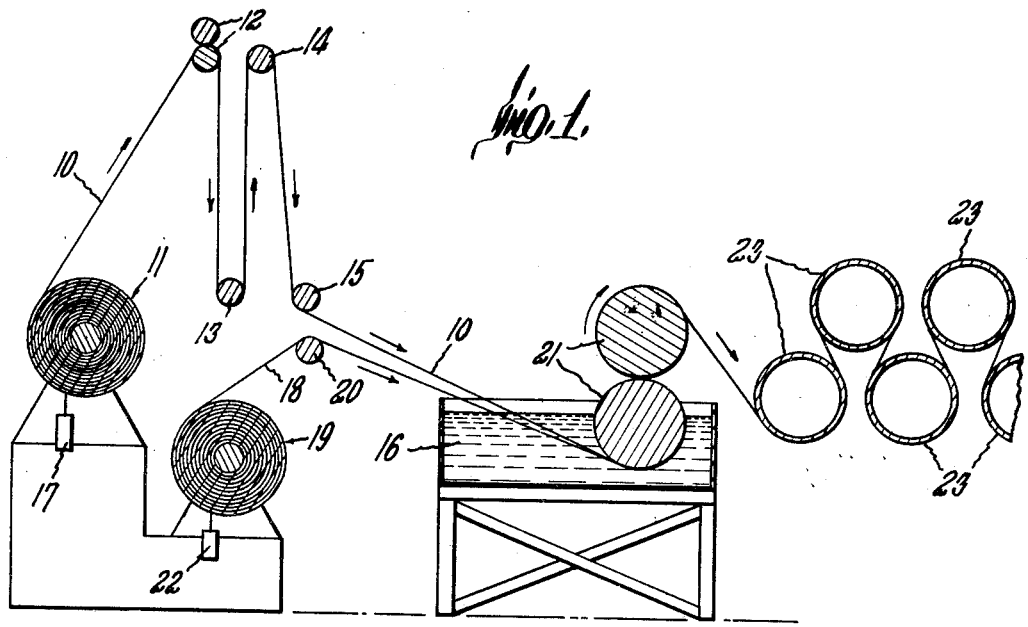
Figure 1 illustrates diagrammatically and conventionally a preferred practice embodying the invention.

As shown in Figure 1, a felt 10 may be progressively unwound from a roll 11 by positively driven rolls 12, passed downwardly under a floating roll 13 and upwardly over a guide roll 14, and thence under a guide roll 15 to a bath 16 of rubber latex. The tension desired in the felt as it is being unwound may be developed through the application of appropriate braking force to the roll 11, such braking means indicated conventionally at 17; and the low degree of tension desired in the felt as it is being impregnated may be created by the floating roll 13 supported by the felt. Simultaneously with the feeding of felt through the bath, a sheet of cloth 18 may be progressively unwound from a roll 19 and passed over a guide roll 20 into the bath 16, the cloth being directed into the bath immediately below and slightly spaced from the felt. Rotating partially submerged in the bath is the lower roll of a pair of positively driven squeeze rolls 21, which serve to draw the cloth under the appropriate tension from the roll 19 as well as to exert a squeezing action, as will presently appear. The cloth is placed under a tension distinctly greater than that applied to the felt by suitable braking means 22 indicated conventionally as acting on the roll 19.

The felt and cloth plies converge toward each other in the bath and, after both plies have remained sufficiently long in the bath to become thoroughly impregnated, come together at the submerged periphery of the lower squeeze roll 21, the cloth being on the outside and exerting a substantially uniform gentle squeeze on the impregnated felt layer in contact therewith in advance of the nip of the rolls 21. The superposed layers pass about considerable peripheral area of the lower roll first in and then out of the bath and into the nip of the rolls 21 wherein they undergo substantial squeezing action designed to remove excess latex which flows back into the bath. The plied layers may proceed from the rolls 21 to a suitable dryer, for instance, a bank of drier drums 23, which delivers the composite sheet in the desired dried condition.

An important feature of the practice hereinbefore described is that the cloth layer is brought into contact with the felt layer after the latter has been thoroughly impregnated and has thus had ample opportunity to expand or swell substantially fully by the action of the aqueous component of the rubber latex impregnant thereupon. By plying the layers after substantially full swelling of the felt layer has occurred, not only are wrinkles avoided in the impregnated felt but crushing of the felt such as may otherwise ensue at the wrinkles is circumvented. Another important feature in such practice is that the cloth layer serves as a carrier or support for the impregnated felt which may itself have very little strength when freshly impregnated with latex, especially when it is quite thin and of high absorptivity. In this connection, we might point out that the felts which we may employ most advantageously may be highly bibulous ones prepared on papermaking machinery from substantially unbeaten or lightly beaten pulps, for instance, refined wood pulp having an alpha cellulose content of upwards of, about, 93%. When such bibulous felts of low compactness are impregnated with rubber latex, they have practically no strength in the freshly impregnated state. This is especially true of felts having a thickness of less than, say, 35 mils, such as we may well use in the practice of the present invention. It is thus seen that according to the present invention, the cloth comes into play to carry or support the felt and maintain its integrity when it is in its soggiest and weakest state and is to undergo substantial squeezing action. When it is attempted first to squeeze some wet latex-impregnated felts by themselves and then to ply them with cloth, crushing and distortion of the wet felts may be experienced and bonding between such felts and cloth may be comparatively poor. So, too, when some felts and cloth are first separately impregnated with latex and are then brought together in freshly impregnated state immediately in the nip of squeeze rolls, the felt may be crushed because of the rapidity with which the felt is freed from excess latex. Again, when some dry felts and cloth are superposed before they are led into the impregnating bath of latex, wrinkles and crush marks may develop in the felt during squeezing to such an extent as to render impossible the realization of an entirely satisfactory product.

Figure 2:
Figure 2 illustrates a modified and less desirable practice.
Figure 2:
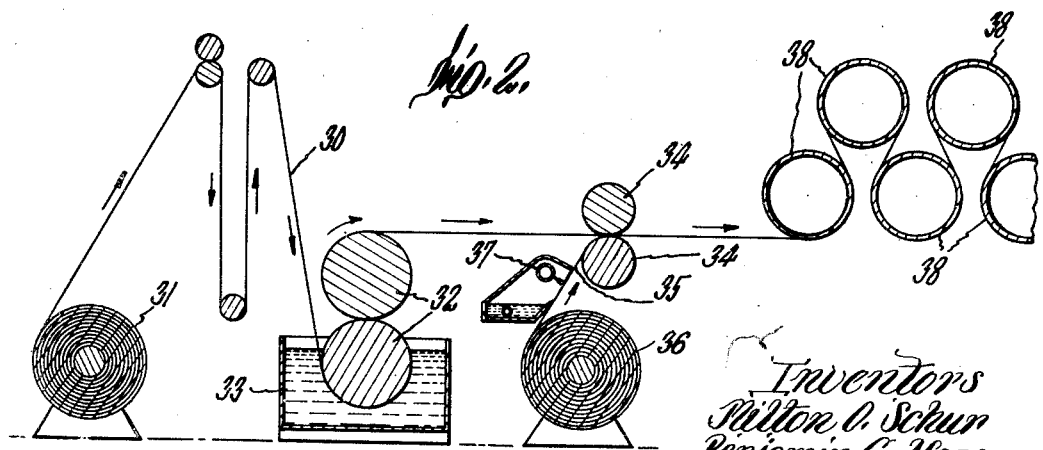

A second practice of producing the fabric-reinforced rubber-impregnated product of the present invention is illustrated in Figure 2, but this practice is not preferred because it requires the use of felts having little tendency to undergo crushing or distortion when squeezed in freshly impregnated state. As shown in this figure, a web of felt 30 is progressively unwound from a roll 31 and led by itself under a roll 32 rotating partially submerged in a bath of latex 33. The roll 32 is shown as the lower one of a pair of squeeze rolls into the nip of which the felt passes immediately after impregnation. After the excess impregnant has been removed from the felt by the squeeze rolls 32, the felt is shown passing into the nip of a second pair of squeeze rolls 34 into which nip cloth 35 freshly impregnated with rubber latex is shown as being progressively and simultaneously fed. Thus, the cloth may be withdrawn from the roll 36 and may be coated by a spray pipe 37 substantially uniformly with latex on the face that is being brought into contact with the freshly impregnated felt. Of course, the cloth may be coated or impregnated with latex by contact with a "kissing" roll or by being led through a bath of rubber latex and squeezed free of excess. The web may be impregnated by contact with a kissing-roll immersed in the impregnating fluid, in which case a great excess of impregnant may be avoided and the tendency of the web to pulp up may be correspondingly reduced. The two plies having been combined while wet by the action of the squeeze rolls 34 may be delivered to a suitable dryer, for instance, a bank of drier drums 38. An advantage of this second practice is that the impregnant for the cloth may be of a character or composition different from that used in the felt, although it is important that both impregnants be miscible so as to yield a composite sheet wherein both the felt layer and fabric reinforcement are interpenetrated and bonded together at their contacting facial portions by the same binder or binder mixture, for instance, rubber, with such tenacity that their separation requires substantially as much effort as separating the felt layer itself into plies. The squeeze rolls 34 used in the second method, like the squeeze rolls 21 used in the preferred method, ensure intermixing of the binder contents of both the felt and the cloth. The practice of Figure 2 not only has the disadvantage that some felts may be crushed or distorted when squeezed by themselves in freshly impregnated state but that the carrying or sustaining action of the cloth is lost, wherefore, one cannot employ the practice of Figure 2 with felts tending to pulp up or disintegrate in a soggy state.

The impregnating bath used in the practice of our method may be a rubber latex composition containing not only rubber latex solids but also such added compounding ingredients as zinc oxide, sulphur vulcanization accelerators, antioxidants, glycerine, dye, and so-called wetting-out agents. The total percent of non-aqueous ingredients in the bath may be about 60%, of which there may be, say, abot 50% of latex solids, the other ingredients thus being used in comparatively small amount to impart to the rubber binder such desired qualities as the appropriate toughness, flexibility, ageing resistance, color, etc. The composite rubber-impregnated felt and cloth may be dried in an air chamber or on steam drums to yield a finished product whose impregnant content, based on the weight of the product, may be about 70% in the felt layer and about 20% in the cloth layer. It should, of course, be appreciated that the cloth layer may not on account of its lower absorbency imbibe anywhere nearly as much impregnant as the felt layer.

It might be noted that in the practice illustrated in Figure 2, the impregnant for the felt layer may be the rubber latex composition hereinbefore described, whereas the impregnant for the cloth may be a glue-glycerine mixture, a glue-latex mixture, or a glue-latex-glycerine mixture. Other latex-miscible bondng agents might be employed for impregnating the cloth layer.

A rubber-impregnated composite sheet produced as hereinbefore described is a valuable leather substitute for various purposes. The kind of cloth or fabric employed as a reinforcement depends largely upon the use to which the artificial leather is to be put. Thus, for example, if the artificial leather is to serve as a shoe upper material simulating calfskin or other natural or smooth leathers, it is preferable to use a fabric or cloth of relatively high thread count, say, one containing about 60 threads in the warp and about 60 threads in the fill, and of relatively fine mesh. This is also true of artificial leather to go into such articles as pocketbooks, belts, hat trimmings, etc. If, on the other hand, the artificial leather is to be used in the manufacture of luggage or as furniture upholstery material, it may be desirable to use as the reinforcing fabric a cloth containing fewer threads per inch and of coarser mesh.

While the rubber-impregnated composite sheet is being dried or after its drying has been effected, the felt surface may be subjected to smoothing action, for instance, to a smoothing or ironing roll, which destroys surface irregularities and develops a substantially smooth surface such as can receive to best advantage thereon a wear-resistant skin coat of substantially uniform thickness simulating the skin side of calfskin or similar natural leathers. To the smooth or ironed felt face may then be bonded a suitable preformed skin or a skin-coating mixture which can be dried down to form the desired skin. The skin-coating mixture may advantageously be of the character disclosed in application Serial No. 653,854, filed January 27, 1933 by us, which has now matured into Patent No. 2,015,441, dated Sept. 24, 1935, as such a mixture leads to a skin coat of the desired qualities. The resultant product is thus composed of three layers, each one of which is preferably of substantial weight. Thus, we may advantageously produce a three layer product wherein the impregnated felt weighs about 10 ounces, the impregnated cloth about 7 ounces, and the skin coat about 5 ounces, each of these weights being per square yard of product. Of course, the particular weight of each of the layers in the finished product may be varied, but in any case, the weight of each of the three layers is preferably substantial.

For best results we prefer to cook the cloth in a bath having strong detergent qualities, for example, one containing about 1% of caustic soda and 2% of oleic acid. After the cloth has been boiled two hours it is thoroughly washed and is then put through a calender wherein its thickness is greatly reduced, for instance, by at least about 30% to 50% of the original thickness. Thus, for example, cloth 15 mils in thickness before calendering is brought down to about 7½ mils. The purpose of the cook is to render the cloth more absorbent and thereby to favor the realization of good bonding between the cloth and the felt. The purpose of the exceptionally drastic calendering is to flatten the threads so that they will not show through at the surface of the completed artificial leather. Despite the fact that the artificial leather is plated or calendered before it is skin-coated, there is a marked, disconcerting tendency for the threads, even though of very fine count, to show through at the surface. This tendency cannot always be overcome by increasing the pressure of plating the composited cloth-felt sheet after impregnation; indeed, heavy plating frequently aggravates the cloth marks at the surface, probably because of the varying density of a sheet of impregnated cloth, the rubber-filled meshes being, of course, much less dense than the ruber-impregnated threads. In order to compensate for the hardening effect of the strong calendering to which the cloth is subjected before use, the cloth may be gently napped as by contact with a rapidly rotating roll of abrasive nature on the face which is to come in contact with the felt. Such napping encourages a strong bond between the felt and the cloth in the finished article.

The function of the fabric in the finished product is to lend strength thereto; and the value of the impregnated felt layer is as a medium which lends itself to embossment and, in the case of a skin-coated product, as a base which is free from cloth marks such as would appear in the skin coat if applied directly to cloth. The function of the skin coat, for instance, the skin coat disclosed in the aforementioned patent application, is to provide a dense surface layer which is wear-resistant, which retains its dense texture over long periods of wear, and which is receptive of gloss-imparting finishes, such as the various leather finishes and other ordinary finishes. It might be observed that by virtue of the fabric reinforcement or backing provided for the felt layer, it becomes possible to coat the felt layer continuously with the skin-coating composition even though the felt layer is so thin that when subjected by itself to the stress or tension necessary for smooth deposition of the skin coat, it tends to undergo undue stretching and distortion.

Figure 3:
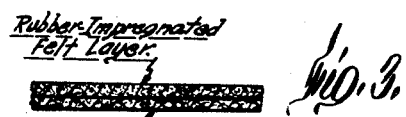
Figure 3 represents a section through a fabric-reinforced rubber-impregnated product such as is produced by the practice of the invention.
Figure 4:
Figure 4 is a similar view of such a product carrying a wear-resistant skin coat on the felted layer.
Figure 4:

In Figure 3 of the accompanying drawing, we have depicted a rubber-impregnated composite sheet comprising a rubber-impregnated cloth layer bonded to a rubber-impregnated felt layer and presenting a smooth upper felt surface such as can be smoothly coated with a dense, wear-resistant coating retentive of its dense texture over long periods of wear and receptive of gloss-imparting finishes, including leather finishes. The same sort of product is shown in Figure 4 carrying such a coating on the smooth felt surface.

The principles of producing a sheet of fabric-reinforced, binder-impregnated felt hereinbefore described may be applied when the binder employed for the felt and reinforcing fabric is a settable liquid binder other than rubber latex. However, they are especially valuable in the case of aqueous binder compositions such as tend to swell, pulp up, or weaken a felt, including aqueous solutions of binders, such as glue solutions or viscose solutions, and aqueous dispersions or emulsions of binders, such as aqueous asphalt emulsions, aqueous gum or resin emulsions, etc. In some instances, after the plies of felt and cloth have been impregnated and combined, for instance, as illustrated in Figure 1, they may be treated with suitable agents serving to set or coagulate the binder, whereupon the composite sheet may be dried or first washed and then dried. Thus, the wet latex-impregnated composite sheet produced as illustrated in Figure 1 may be treated with some such coagulant as acid solution or acid vapor, for instance, acetic acid solution or vapor, and, if desired, washed, before being passed to the dryer.

In using the word "fabric" in the foregoing description and in the appended claims, we mean a woven cloth or such equivalents as knitted cloths.

The present application is a division of our application Serial No. 20,829, filed May 10, 1935.

We claim:

1. A composite sheet comprising a felt layer bonded to a cloth reinforcement whose threads have been permanently flattened out of contact with said felt layer.

2. A composite sheet comprising a felt layer bonded to a cloth reinforcement whose threads have been permanently flattened and compressed markedly out of contact with said felt layer.

3. A composite sheet comprising a felt layer bonded to a cloth reinforcement whose threads have been flattened and compressed markedly and whose face contacting with the felt layer has been napped.

4. A composite sheet comprising a felt layer carrying on one face a dense, wear-resistant coating and bonded on its other face to a cloth reinforcement whose threads have been permanently flattened out of contact with said felt layer.

5. A composite sheet comprising a felt layer carrying on one face a dense, wear-resistant coating and bonded on its other face to a cloth reinforcement whose threads have been flattened and compressed markedly and whose face contacting with the felt layer has been napped.

6. A composite sheet comprising a felt layer bonded to a cloth reinforcement whose threads have been permanently compressed out of contact with said felt layer to reduce its thickness by at least about 30% to 50%.

7. A composite sheet comprising a rubber-impregnated felt layer bonded to a cloth reinforcement whose threads have been permanently compressed out of contact with said felt layer to reduce its thickness by at least about 30% to 50%.

8. A composite sheet comprising a rubber-impregnated felt layer rubber-bonded to a rubber-impregnated cloth reinforcement whose threads have been permanently compressed out of contact with said felt layer to reduce its thickness by at least about 30% to 50%.

9. A composite sheet comprising a felt layer bonded to a cloth reinforcement whose threads have been compressed to reduce its thickness by at least about 30% to 50% and whose face contacting with the felt layer has been napped.

10. A composite sheet comprising a felt layer carrying on one face a dense, wear-resistant coating and bonded on its other face to a cloth reinforcement whose threads have been permanently compressed out of contact with said felt layer to reduce its thickness by at least about 30% to 50%.

11. A composite sheet comprising a felt layer carrying on one face a dense, wear-resistant coating and bonded on its other face to a cloth reinforcement whose threads have been compressed to reduce its thickness by at least about 30% to 50% and whose face contacting with the felt layer has been napped.

MILTON O. SCHUR.
BENJAMIN G. HOOS.